United States Patent [19]

Faure

[11] 4,189,943
[45] Feb. 26, 1980

[54] APPARATUS FOR VOLUME MEASUREMENT OF LIQUIDS

[76] Inventor: Jean M. Faure, 28 Avenue Aristide Briand, Savigny sur Orge, 91600, France

[21] Appl. No.: 842,032

[22] Filed: Oct. 11, 1977

Related U.S. Application Data

[63] Continuation-in-part of Ser. No. 670,236, Mar. 25, 1976, abandoned.

[30] Foreign Application Priority Data

Mar. 25, 1975 [FR] France ............................. 75 09286
Jul. 30, 1975 [FR] France ............................. 75 23833

[51] Int. Cl.² .......................................... B01H 3/02
[52] U.S. Cl. ............................................ 73/425.6
[58] Field of Search ................. 73/425.4 P, 425.6; 222/395

[56] References Cited

U.S. PATENT DOCUMENTS

| | | | |
|---|---|---|---|
| 1,989,030 | 1/1935 | Wade | 222/395 |
| 3,494,201 | 2/1970 | Roach | 73/425.4 P |
| 3,831,618 | 8/1974 | Liston | 73/425.6 |

Primary Examiner—S. Clement Swisher
Attorney, Agent, or Firm—Craig and Antonelli

[57] ABSTRACT

A liquid volume measuring apparatus in constructed to simultaneously solve the problems of accuracy of measurement, contamination of the liquid, and speed of operation. This apparatus utilizes a containing element for the liquid to be transferred, an aspiration system for filling the containing element, and a control liquid being immiscible with the liquid to be transferred to form a liquid piston to distribute the liquid without an air dead space therebetween, and to simultaneously act as a cleaning agent of the containing element. By this means, another different liquid can be dispensed by the apparatus without contamination by the previously dispensed liquid.

10 Claims, 1 Drawing Figure

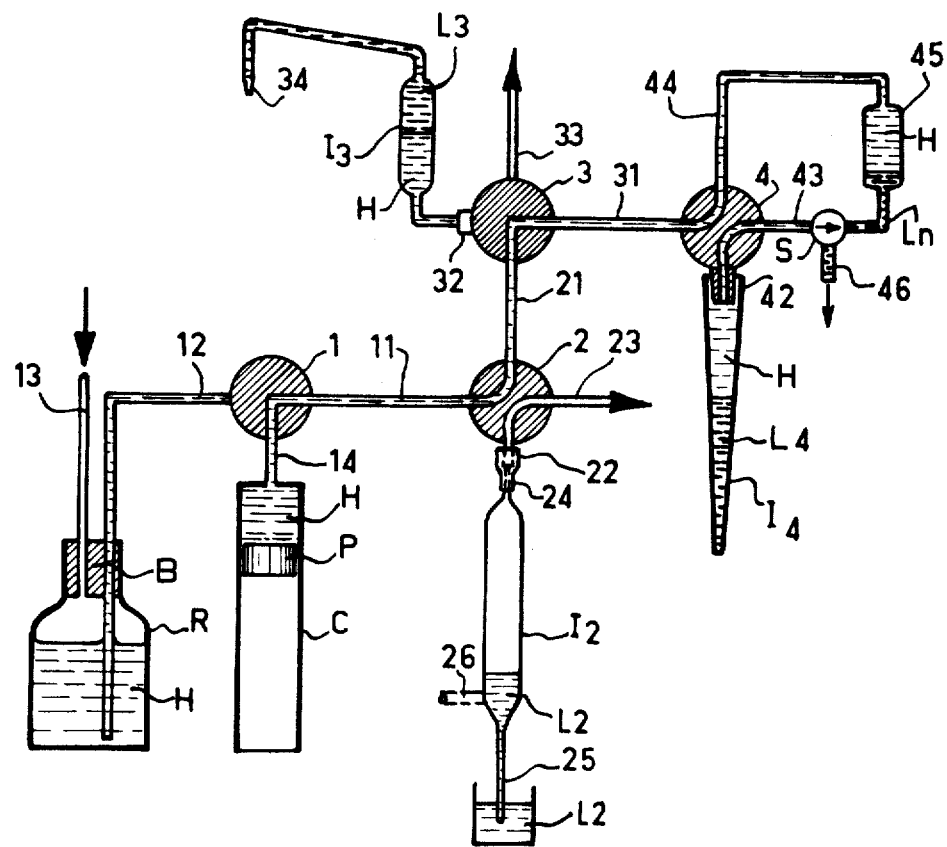

APPARATUS FOR VOLUME MEASUREMENT OF LIQUIDS

This is a continuation-in-part application of U.S. patent application, Ser. No. 670,236, filed Mar. 25, 1976, now abandoned, which is hereby incorporated by reference, and the benefit for all common subject matter is hereby claimed.

The present invention relates to immediate successive dispensing and transfers of measured volumes of different liquids from their various containers into chambers where reactions take place and/or the results of these reactions are measured and determined.

In laboratories, many liquids, samples, stable reagents, and unstable reagents, which are prepared ad hoc and are expensive or available in small volumes must be transferred in precise volumes as rapidly as possible.

Three problems arise:

(1) Problems of accuracy: Accuracy of volume measurement requires the absence of any dead volume whatever between a piston of the dispenser and the liquid to be dispensed;

(2) Contamination problems: Contamination arises between the various liquids successively dispensed, which problems are aggravated by the large number of these liquids and often by their small available volume;

(3) Speed problems: Immediate availability is necessary enabling any volume of any liquid to be transferred immediately, and moreover, immediately after the transfer of either any volume of the same liquid or of any volume of a different liquid.

In order to transfer a liquid from a first container into a second container, this transfer must be made by means of a third container provided with some transfer and dispensing mechanism (aspiration-discharge). To resolve the three problems raised above simultaneously with the same apparatus, such an apparatus must have a chamber provided with the transfer mechanism, available without dead volume, wherein there is not a trace of another liquid with which the liquid to be transferred could be mixed.

In the present state of the art, there exist numerous types of apparatus, each with special qualities, but none able to resolve all three problems raised above at the same time.

In a first type of apparatus to which transfer containers are permanently connected, each liquid has its own chamber which is totally filled so that, the concern being one of accuracy, there is no dead volume. Because there are many such types and any type of piston may be used (solid, liquid, flexible, etc.) only the most generalized form of operation will be described. The chamber in which the piston moves is connected to a switching element to which two other tubes are connected, one of which extends into the bottle of liquid to be dispensed, and the other is open to the air. Each liquid to be transferred is contained in its own chamber and totally fills these chambers without any dead volume. When the piston moves in the chamber, it aspirates the liquid through the first tube and the switching element; and when the switching element is switched, the piston moving in the opposite direction in the chamber discharges the aspirated liquid through the switching element and the second tube.

Thus, with stable reagents in a limited number, each of which permanently occupies its own chamber, this type of apparatus may resolve the three problems raised above: accuracy, contamination, and speed; but this apparatus is not immediately available for transferring other liquids, liquids whose containers are not permanently connected thereto, and liquids which do not have their own chambers. In fact, a new liquid can be dispensed only after complete removal of the liquid which filled an entire chamber, and this requires careful lengthy rinsings: first with a neutral liquid, then with the liquid to be dispensed, in order to remove every trace of the neutral liquid. To this immediate unavailability of use, must be added the uncertainty as to the quality of the rinsings, and it is impossible to transfer liquids, available only in very small volumes, with this type of apparatus, because rinsing is then impossible (for example: specimens for analysis, expensive or delicate reagents).

In a second type of apparatus, called a dilutor, the volume of the sample to be transferred is aspirated into an element containing a control liquid (diluent or reagent) miscible with this sample, then mandatorily transferred as a whole with a substantial volume of control liquid. Since the liquids are miscible, an indeterminate quantity of sample is dispersed within the control liquid and one cannot be certain of transferring the total volume of sample unless a sufficiently large volume of control liquid is transferred therewith.

This type of apparatus thus resolves the three problems raised above: accuracy (no dead volume), noncontamination (the preceding sample is completely removed), and speed (immediate availability to transfer one sample immediately after the other), but, with this type of apparatus, it is not possible to:

transfer undiluted liquids not mixed with other liquids;

transfer successive volumes of the aspirated liquid after a single aspiration (the aspirated liquids must be transferred as a whole);

pass immediately from one reagent to the next, if these reagents are used as control liquids.

In a third type of apparatus, an attempt has been made to remedy these disadvantages by placing a small air cylinder between the control liquid and the liquid to be transferred, which air cyllinder permits the transfer of undiluted liquids. This type of apparatus uses chambers which are small-diameter tubes not wettable by the control liquid or by the liquids to be transferred. The liquids to be transferred are passed after the control liquid and the air cylinder into the tube serving as a chamber and occupy the place which the control liquid had occupied before them. Although the chamber is made of a non-wettable material, traces of control liquid do remain on the walls and since this liquid is miscible with the liquid to be dispensed they contaminate this liquid. To this disadvantage is added the presence of a dead volume (air cylinder) which destroys the accuracy.

In a fourth type of apparatus, finally, which also permits transfer of one liquid to be followed immediately by that of another liquid without diluting or contaminating it, the liquid to be transferred is aspirated into an interchangeable chamber, changed after each transfer, adapted to be connected to the end of the cylindrical body in which a piston moves. The major disadvantage of this type of apparatus is the absence of accuracy due to the dead volume of elastic air between the piston and the liquid to be dispensed.

The purpose of the present invention is to provide an apparatus combining the special qualities of the known types mentioned hereinabove, but without their disadvantages, namely to provide an apparatus which simultaneously solves the three problems described above (accuracy, noncontamination, and speed), and which enables rapid, successive, and very precise transfers of equal or unequal volumes of one and the same liquid to be made automatically, but can renew these same operations immediately for another liquid.

According to the present invention, the apparatus uses an element designed to contain the liquid to be transferred, means for bringing the liquid thereto, a control liquid with which it is immiscible and forming a piston to distribute it, the assembly being designed such that the liquid to be transferred is not contaminated by a previously dispensed liquid and that there remains no dead volume between the liquid piston and said liquid.

In accordance with further features of the present invention, the element designed to contain the liquids to be transferred can be constructed without precision or without strict tolerances. This element may be made of a material that is not wettable by the liquids to be transferred, such as a material providing the element with perfectly smooth walls, including glass, stainless steel or the like.

An apparatus according to the invention is shown as schematic view in the attached FIGURE.

Referring to the single drawing FIGURE, a liquid dispenser is illustrated schematically by a cylinder C in which a piston P moves, and which is connected by a tube 14 to an automatic valve 1 providing connection to two other tubes 11 and 12. This automatic valve 1 connects either tubes 14 and 12 or tubes 14 and 11. Tube 12 extends through a stopper B, also traversed by a tube 13, to the bottom of a reservoir R containing a control liquid H. Tube 11 is connected at its other end to a four-way switchable valve 2 having further outlets connected to tubes 23, 22, 21. Tube 23 is connected to an aspiration system not shown in the FIGURE, but of a known type, and designated by the arrow.

A tube 24 made of flexible material is connected to tube 22 with tube 22 being very easily connectable and disconnectable in a sealed manner to and from the end of a container element $I_2$, also easily exchangeable. The other end of tube 21 is connected to a four-way switchable valve 3 having further outlets which are connected to tubes 33, 32, 31 respectively. Like tube 23, tube 33 is connected to an aspiration system designated by an arrow. An element $I_3$, also exchangeable, can easily be connected to tube 32. The other end of tube 31 is connected to another four-way switchable valve 4 having outlets which are connected to tubes 44, 43, and 42 respectively.

Tube 44, a part 45 of which is filled, and tube 43 are connected to a system with a valve S to which a tube 46 is connected. An exchangeable element $I_4$ can be easily connected to tube 42. Tubes 12, 14, 11, 21, 31 and 44 are filled with control liquid H without dead volume.

Appropriate methods of operation of this apparatus will now be described as examples.

With valves 2, 3, 4 in the positions illustrated in the figure, element $I_2$, which is empty, new and clean, is connected to tube 24. With open end 25 of this element $I_2$ extending into the liquid to be dispensed $L_2$, which is immiscible with liquid H, and in this example has a higher density, liquid $L_2$ is aspirated by means of the aspiration system connected to tube 23 until at least element $I_2$ and tubes 24 and 22 are full of liquid $L_2$. When valve 2 is switched, tubes 11 and 22 are connected with each other, and piston P can send a volume v of liquid H into element $I_2$, thereby creating a liquid piston in element $I_2$. An equal volume v of liquid $L_2$ is dispensed through open end 25 of $I_2$ by this liquid piston. A new volume of liquid v' can immediately be dispensed, v' being equal or unequal to v; and the process continues until all the liquid $L_2$ has been emptied from element $I_2$. At this time, if it is desired to continue dispensing liquid $L_2$, one can fill $I_2$ once more with this liquid, either by aspirating it through tube 23 as before, after turning valve 2, or by aspirating with piston P without having to turn this valve.

Also, it is then immediately possible to dispense another liquid $L'_2$, different from $L_2$, either by removing $I_2$ and replacing it by a new element containing the different liquid $L'_2$ and resuming the operations described above, or if $I_2$ is made of a suitable material, by completely emptying liquid $L_2$ from $I_2$, filling it with liquid H, and then drawing the desired volume of new liquid into $I_2$. Liquid H which, according to the invention, is immiscible with the liquids to be dispensed, thus removes all traces of liquid $L_2$ from element $I_2$. The element is made of a material not wettable by either the liquid to be dispensed or by control liquid H. The walls of the element $I_2$ can be perfectly clean and smooth.

It will be noted that with the processes according to the invention, the three aforementioned problems are solved: speed (a liquid can be dispensed immediately after another liquid), no dead volume, and no contamination. Moreover, the liquids can be dispensed in the pure undiluted form and, if desired, in successive equal or unequal volumes.

The method by which exchangeable empty element $I_2$ is filled by aspiration through tube 23 has been described. The aspiration through tube 23 can be accomplished either by a known aspiration means, or directly with piston P by connecting tube 13 to tube 23 and connecting tube 14 to tube 12 through valve 1, then aspirating by means of piston P and elements 14, 12, R, 13, 23. It is also possible to operate as follows: with open end 25 of $I_2$ immersed in liquid H, this liquid is aspirated until $I_2$ is completely filled; and piston P discharges the air of the dead volume aspirated into bottle R via tubes 14 and 12. One need then only to aspirate the desired quantity of liquid to be transferred $L_2$ into element $I_2$ by means of piston P; tubes 14, 11, 22, 24, and the end of $I_2$ are immersed in this liquid.

It is also possible, by means of piston P, to automatically fill an empty element, just connected to the apparatus, by operating as follows: with empty element $I_4$ being connected to tube 42, and valves 1, 2, 3 occupying the positions in the FIGURE, piston P aspirates liquid $L_4$ via tubes 11, 21, 31, 44, 43 and 42, the end of $I_4$ being immersed in this liquid, until the entire element is filled, at least up to tube 43. When piston P rises again, the air aspirated into tube 45 will be discharged via tube 46 by means of valve S.

Element $I_3$ illustrates the case in which the liquid to be dispensed $L_3$ has a lower density than control liquid H.

According to the invention, one can dispense a liquid miscible with control liquid H. To do this, it is sufficient, by choosing a liquid $L_3$ immiscible with the liquid to be dispensed, to connect an exchangeable element to end 34 of $L_3$. A liquid $L_5$ miscible with H and immiscible with $L_3$ can be dispensed.

According to the invention, the apparatus can be used as a dilutor, with the advantage of having a dilutor whose diluent reagent can immediately be changed. One need only aspirate a sufficient volume of diluent reagent $L_2$, for example, into $I_2$ then aspirate the microquantity of sample to be diluted into 25, and deliver this sample with a certain volume of liquid $L_2$.

The apparatus as described is only an illustrative example. It can be simplified or improved by any known means.

The apparatus, which dispenses control liquid H, can be composed of any known dispenser (stepping motor, electronic control, etc.). Valves 2, 3, 4 can be eliminated in which case $I_2$ is filled via piston P and the air is impelled toward container R. Element $I_2$ does not need to be exchangeable if its design is appropriate.

Valves 1, 2, 3, 4 can be more numerous and of different design, for example automatic or electronic.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. An apparatus for transferring a liquid in one or more successive volumes and immediately reusable for transferring another different liquid, said apparatus comprising first means for containing a liquid to be transferred, second means for bringing said liquid into position in said first means, a single control liquid immiscible with said liquid to be transferred and forming a liquid piston to distribute said liquid, wherein said liquid piston contacts said liquid to be transferred without a dead air volume therebetween, and wherein said liquid to be transferred is not contaminated by a previously dispensed liquid, and wherein said first means comprises a containing element made of a material not wettable by said liquid to be transferred or by said control liquid.

2. An apparatus according to claim 1, wherein said containing element is built without precision and without strict tolerances.

3. An apparatus according to claim 2, wherein said containing element is easily exchangeable.

4. An apparatus for transferring a liquid in one or more successive volumes and immediately reusable for transferring another different liquid, said apparatus comprising first means for containing a liquid to be transferred, second means for bringing said liquid into position in said first means from outside said apparatus, a control liquid immiscible with said liquid to be transferred and forming a liquid piston to distribute said liquid, wherein said liquid piston contacts said liquid to be transferred without a dead air volume therebetween, and wherein said liquid to be transferred is not contaminated by a previously dispensed liquid, and wherein said first means for containing a liquid to be transferred has perfectly smooth walls wherein said first means comprises a containing element made with walls of perfectly smooth material such as glass, stainless steel moulded plastic or the like.

5. An apparatus according to claim 1, wherein said first means is fillable with said control liquid by said second means.

6. An apparatus according to claim 1, wherein said apparatus is for diluting as well as transferring in that in a first stage said second means can bring a diluting liquid into said first means and in a second stage said second means can bring the liquid to be transferred into said first means whereby said liquid to be transferred is diluted by said diluting liquid in said first means.

7. An apparatus for dispensing liquids comprising:
first means for containing a liquid to be transferred,
second means for introducing a single control liquid which is immiscible with said liquid to be transferred into contact with liquid in said first means to form a liquid piston therewith for dispensing said liquid to be transferred from said first means, and simultaneously cleaning said liquid from said first means by said single control liquid, and
wherein said first means is easily exchangeable to provide another liquid to be transferred.

8. An apparatus according to claim 7, wherein another liquid to also be transferred can be immediately introduced into said first means to be dispensed by said control liquid without separate cleaning of the previous liquid to be transferred from said first means.

9. An apparatus according to claim 7, wherein said liquid to be transferred can be diluted by providing a diluent liquid in said first means which can be also dispensed and simultaneously cleaned by said single control liquid.

10. An apparatus for transferring a liquid in one or more successive volumes and immediately reusable for transferring another different liquid, said apparatus comprising first means for containing a liquid to be transferred, second means for bringing said liquid into position in said first means from outside said apparatus, a control liquid immiscible with said liquid to be transferred and forming a liquid piston to distribute said liquid, wherein said liquid piston contacts said liquid to be transferred without a dead air volume therebetween, and wherein said liquid to be transferred is not contaminated by a previously dispensed liquid, and wherein said first means is easily exchangeable to provide another liquid to be transferred.

* * * * *